(12) United States Patent
Achtereekte et al.

(10) Patent No.: US 8,916,083 B2
(45) Date of Patent: Dec. 23, 2014

(54) METHOD AND DEVICE FOR MANUFACTURING MATERIALS FROM HYDROPHOBIC HOLLOW NATURAL FIBRES, AND USE THEREOF

(75) Inventors: Marco Hendrikus Bernardus Achtereekte, Deventer (NL); Sheila Adimargono, Wageningen (NL)

(73) Assignee: Ronald van der Boor (NL)

( * ) Notice: Subject to any disclaimer, the term of this patent is extended or adjusted under 35 U.S.C. 154(b) by 1250 days.

(21) Appl. No.: 12/302,915

(22) PCT Filed: May 31, 2007

(86) PCT No.: PCT/NL2007/050254
§ 371 (c)(1),
(2), (4) Date: Jul. 15, 2009

(87) PCT Pub. No.: WO2008/004863
PCT Pub. Date: Jan. 10, 2008

(65) Prior Publication Data
US 2009/0312229 A1    Dec. 17, 2009

(30) Foreign Application Priority Data

Jun. 2, 2006  (NL) .................................. 2000086

(51) Int. Cl.
| | | |
|---|---|---|
| *B29C 69/00* | (2006.01) | |
| *D04H 1/04* | (2012.01) | |
| *A47L 13/16* | (2006.01) | |
| *B01D 39/02* | (2006.01) | |
| *C02F 1/68* | (2006.01) | |
| *D04H 1/54* | (2012.01) | |
| *D04H 1/544* | (2012.01) | |
| *C02F 1/28* | (2006.01) | |

(52) U.S. Cl.
CPC *D04H 1/04* (2013.01); *A47L 13/16* (2013.01); *B01D 39/02* (2013.01); *C02F 1/681* (2013.01); *D04H 1/54* (2013.01); *D04H 1/544* (2013.01); *C02F 1/286* (2013.01)
USPC .......................................................... 264/345

(58) Field of Classification Search
CPC .......... B29C 69/00; B29C 43/00; B29C 45/00
USPC .................................................. 264/345, 413
See application file for complete search history.

(56) References Cited

U.S. PATENT DOCUMENTS

| | | |
|---|---|---|
| 1,821,378 A | 9/1931 | Dillard |
| 2,464,301 A | 3/1949 | Francis, Jr. |

(Continued)

FOREIGN PATENT DOCUMENTS

| | | |
|---|---|---|
| JP | 54 047887 A1 | 4/1979 |
| JP | 54 104491 A | 8/1979 |

(Continued)

OTHER PUBLICATIONS

European Patent Office, PCT Written Opinion of the International Searching Authority, International Application No. PCT/NL2007/050254, Officer Rainier Barathe.

*Primary Examiner* — Larry Thrower
*Assistant Examiner* — Xue Liu
(74) *Attorney, Agent, or Firm* — Kaplan Breyer Schwarz & Ottesen, LLP

(57) ABSTRACT

The invention relates to a method for processing hydrophobic hollow natural fibers, in particular vegetable hollow natural fibers and more particularly kapok fibers, to form material, and to a material obtainable by such a method. The invention furthermore relates to "the use of such amaterial as absorption medium for apolar substances and a device for performing the method.

14 Claims, 2 Drawing Sheets

(56) References Cited

U.S. PATENT DOCUMENTS

Figure 1:
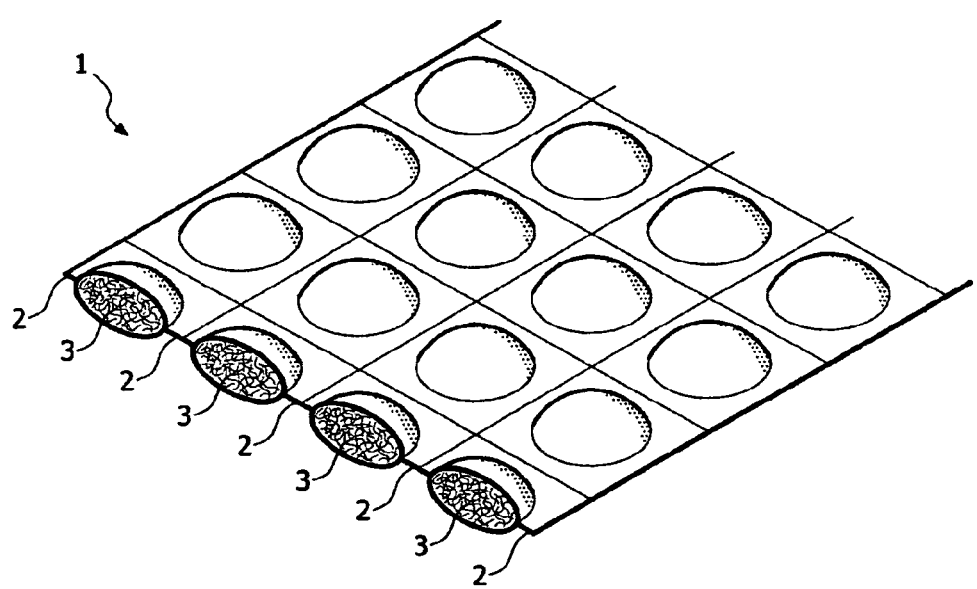

| | | | |
|---|---|---|---|
| 3,892,909 A * | 7/1975 | Miller | 428/371 |
| 4,061,567 A | 12/1977 | Kobayashi et al. | |
| 6,681,521 B1 * | 1/2004 | Holloway | 47/56 |
| 2003/0019125 A1 * | 1/2003 | Hanaya | 34/114 |
| 2005/0148258 A1 * | 7/2005 | Chakravarty et al. | 442/327 |
| 2006/0070294 A1 * | 4/2006 | Spittle | 47/9 |

FOREIGN PATENT DOCUMENTS

| | | |
|---|---|---|
| JP | 54104491 A | 8/1979 |
| JP | 59 082992 A | 5/1984 |
| JP | 04 161289 A | 6/1992 |
| JP | 07 108170 A | 4/1995 |
| JP | 10 323661 A | 12/1998 |
| WO | 91/02041 A | 2/1991 |

* cited by examiner

METHOD AND DEVICE FOR MANUFACTURING MATERIALS FROM HYDROPHOBIC HOLLOW NATURAL FIBRES, AND USE THEREOF

The invention relates to a method for processing hydrophobic hollow natural fibres to form a material. The invention further relates to a material obtainable by such a method. The invention furthermore relates to the use of such a material as absorption medium for apolar substances. In addition, the invention relates to a device for performing the method.

Hydrophobic hollow natural fibres are distinguished from polar hollow natural fibres, such as cotton fibres, by their water-repellent and oil-absorbing properties. The best known hydrophobic hollow natural fibres are the fibres originating from kapok (*Ceiba pentandra*), milkweed (*Asclepias*), trees of the Bombaceae or Malvaceae family (including silk-kapok (*Bombax ceiba*) and silk-cotton (*Bombax pentandra*)), wool and silk. Hydrophilic fibres such as cotton are water-absorbent and generally have a moderate absorbent capacity for apolar substances such as oil. A hydrophobic fibre such as kapok is on the other hand strongly water-repellent and has a high absorbing capacity for apolar substances. The absorption capacity is achieved by a combination of absorption, adsorption and capillary action. A usual measure for apolarity is the contact angle which the material makes in contact with mineral oil. For hydrophobic materials this contact angle is smaller than 60°. For exceptionally hydrophobic materials this contact angle is even smaller than 45°. Hollow natural fibres are distinct from solid natural fibres such as wood fibres.

A drawback of vegetable hydrophobic hollow natural fibres such as kapok fibres is that, in contrast to cotton, they are relatively difficult to process to form materials, particularly because insufficient tensile strength is obtained. Fibres such as kapok are therefore mainly used as filler, wherein the kapok is held together by a tensively strong casing of another material.

It is an object of the present invention to realize a simple method for manufacturing materials from hydrophobic hollow natural fibres with an improved tensile strength.

The invention provides for this purpose a method for manufacturing an apolar sorption material, comprising the processing steps of: providing hydrophobic hollow natural fibres with a hemicellulose content of at least 10% by weight; heating at least a part of the hollow natural fibres to at least the glass transition temperature of hemicellulose, and compressing at least a heated part of the treated hollow natural fibres. It has been found that with such a method a material is obtained with an improved tensile strength compared to untreated hydrophobic hollow natural fibres. The obtained material is moreover found to have a good sorption capacity for apolar substances. Another advantage is that no additives such as glues or other cross-linkers are necessary, so that a fully biodegradable material is possible. A higher hemicellulose content results in a greater improvement in the tensile strength. The hemicellulose content is preferably higher than 20% by weight. The method is not suitable for a textile fibre such as cotton because cotton has a hemicellulose content no higher than 6%. The glass transition temperature ($T_g$) of hemicellulose depends on the degree of hydration and can be reduced by wetting. Pre-treatment of the hollow natural fibres with surfactants can also reduce the glass transition temperature of hemicellulose. After compression the obtained material is cooled to below the glass transition temperature, wherein the obtained product has an improved cohesion of fibres and tensile strength. It is assumed that, above the glass transition temperature, the hemicellulose enters a gel phase (or a melted state at higher temperatures) wherein links between different fibres are formed during compression.

The hollow natural fibres can be of one type, but a mixture of different types of hollow natural fibre can also be envisaged. The fibres processed to form material according to the invention have a greater cohesion after the compression than the same fibres which are compressed at a lower temperature, or which are heated with a method other than a steam treatment. Depending on the desired application, the material can be pressed into different two and three-dimensional shapes. As pressure increases, the obtained material generally has a lower sorption capacity.

In a preferred embodiment the hollow natural fibres are compressed to form a material layer. A material layer is suitable for many different applications. The material layer is a mat or mat-like product, which can for instance take the form of a water-repellent sheet, an absorption element or a cloth.

During heating the temperature is most preferably at least the melting temperature of hemicellulose. At the melting temperature of hemicellulose it is possible to utilize a relatively short contact time during the compression, whereby the method can be per formed rapidly.

It is advantageous if the temperature during compression is at least 90° C., preferably at least 120° C. Such a temperature is sufficient to reach the glass transition temperature of hemicellulose and, in a sufficiently short contact time during compression, to obtain the intended material properties. Such a method makes it possible in simple manner to manufacture materials from hydrophobic hollow natural fibres with a greater tensile strength than is possible with the known methods. At least during compression the temperature is preferably between 160° C. and 220° C., preferably between 170° C. and 190° C. At these temperatures the contact time and the improvement in the tensile strength and cohesion of the fibres is optimized. Temperatures above 220° C. increase the chance of oxidation or degeneration of the fibres, which can have an adverse effect on the material properties and can moreover result in an undesired discolouration of the material.

It is advantageous if at least a part of the hollow natural fibres is wetted with water at least during heating. Wetting is found to result in an improvement in the tensile strength of the obtained material. Wetting can take place with water in any form, in particular gaseous or liquid, which is for instance applied by spraying or atomizing. Most advantageous is wetting by means of steam, because at least part of the heating is also effected by steam treatment.

It is recommended that the material wetted before compression is dried after compression by bringing the material into contact with a gas flow. Moisture present in the material is thus removed quickly and easily, while the material moreover cools more rapidly, so that the processing time is shortened. Cooled material can readily be used in further processing steps; if material is warm the tensile strength is not yet sufficient for some processes. Dry air is preferably used as drying gas. The drying gas preferably has a degree of humidity lower than 85% relative humidity at the used temperature, wherein 100% is the gas saturated with water vapour at the same temperature.

The hollow natural fibres preferably come from the group consisting of kapok, silk-cotton and milkweed. Kapok, silk-cotton and milkweed are also understood to mean fibres obtained from related crops, of which a number of examples have been given in the introduction. These hollow natural fibres are found to be particularly practicable for the intended method, in particular the hollow natural fibres with a composition of between 30-60% by weight of cellulose, between 20 and 50% by weight of hemicellulose and between 10 and 25% by weight of lignin. Mixtures of different types of hydrophobic hollow natural fibre are also possible.

The best results are obtained if the hollow natural fibres are substantially kapok fibres. Kapok fibres comprise between 40-50% by weight of cellulose, between 30 and 40% by weight of hemicellulose and between 15 and 20% by weight of lignin. Kapok moreover has a ready availability.

In a preferred embodiment the hydrophobic hollow natural fibres are mixed substantially homogeneously with reinforcing fibres prior to the heating. Through the use of reinforcing fibres an even better tensile strength of the material is obtained, which may be desired for some applications. A drawback of adding reinforcing fibres is that higher percentages of reinforcing fibres adversely affect the sorption capacity of the obtained material. Materials with a percentage by weight of more than 50% reinforcing fibres are therefore generally found to be no longer useful for sorption applications. Reinforcing fibres can also make processing more difficult.

The quantity of reinforcing fibres is preferably 3-20% by weight relative to the hollow natural fibres. At such a quantity of reinforcing fibres a considerable improvement in the tensile strength of the material is achieved, in combination with a usable absorption capacity. The content of reinforcing fibres is most preferably between 5 and 10% by weight, wherein a good balance between tensile strength and absorption capacity is obtained for most applications. Materials with a sorption capacity of at least 1 gram of apolar substance per gram of material, preferably more than 5 grams of apolar substance per gram of material, most preferably more than 10 grams per gram of material are considered to be useful. Above 20% by weight of reinforcing fibres the resulting material is generally less suitable for applications wherein large quantities of apolar liquids have to be absorbed.

It is advantageous if the reinforcing fibres are chosen from the group comprising synthetic fibres, wool, jute and hemp. Use of these fibres results in materials with a good tensile strength and absorption capacity. Synthetic fibres can consist of different types of synthetic fibre, including thermoplastic synthetic fibres. Hemp and jute have the advantage relative to synthetic fibres that the final product consists entirely of biodegradable materials. Mixtures of different types of reinforcing fibre are also possible.

In a preferred embodiment the hollow natural fibres are mixed with wool fibres and/or silk fibres as reinforcing fibres. The fibres of wool or silk-coming from animals give the obtained material extra tensile strength. The quantity of wool and/or silk is preferably between 1 and 10% by weight relative to the vegetable hollow natural fibres such as kapok.

It is advantageous if the reinforcing fibres are thermoplastic synthetic fibres, wherein the temperature during heating is at least equal to the melting temperature of the synthetic fibres. Such a method produces materials which, after cooling to room temperature, have a greatly improved tensile strength relative to materials which only incorporate kapok. The thermoplastic plastic is preferably apolar, whereby a good mixing and binding with the hydrophobic hollow natural fibres is possible. Polar plastics such as vinyl acetate or cellulose acetate are less suitable because in melted state they do not adhere sufficiently to the hydrophobic hollow natural fibres such as kapok. The oil-absorbing capacity of the synthetic fibres will generally be lower than that of the hollow natural fibres, so that the higher the content of synthetic fibres, the lower the oil-absorbing capacity per gram of material of the material obtained by mixing synthetic fibres and hollow natural fibres.

In a preferred embodiment the material according to the invention comprises at least a mixture of hydrophobic hollow natural fibres and apolar thermoplastic synthetic fibres, wherein the material has a tensile strength chosen subject to the desired application. Although such materials generally have a lower oil-absorbing capacity than the corresponding material without synthetic fibres, these materials have a greatly improved tensile strength. The content of plastic preferably lies between 5 and 20% by weight relative to the quantity of hollow natural fibres, because at such percentages a good tensile strength is combined with a good oil-absorbing capacity. A material manufactured from kapok fibres with a percentage of between 5 and 20% by weight of polypropylene fibres will for instance provide a good tensile strength and an oil-absorbing capacity of more than 10 times its own weight.

It is advantageous if the thermoplastic synthetic fibres have a melting temperature between 150 and 190° C. At such temperatures a good improvement in the tensile strength is obtained within a short contact time during pressing.

The thermoplastic synthetic fibre is preferably a polyolefin or a block copolymer of a polyolefin. Such thermoplastic synthetic fibres have a good processability and enable a good connection to the hollow natural fibres. Polyolefins are particularly suitable for processing with kapok.

It is advantageous if the reinforcing fibres are polypropylene fibres and the hollow natural fibres are kapok fibres. The combination of polypropylene fibres and hollow natural fibres is found to be simple to process and results in materials with good tensile strength. The polypropylene most preferably has a melting point of about 90° C.-160° C., which produces a mixture with particularly good processability in combination with kapok fibres.

The heating preferably takes place by means of at least one heating method chosen from the group consisting of: steam, hot gas, ultrasonic, infrared, microwave, induction, and dielectric heating. Combinations of two or more techniques can also be envisaged. Some of these techniques are per se known for the processing of plastics, as described in A. Yousefpour et al., Journal of Thermoplastic Composite Materials, vol. 17, July 2004, p. 303 (Sage Publications).

It is particularly advantageous if the heating method comprises of steam heating. Steam heating ensures a good heat transfer, at the same time ensures wetting of the fibres, and also reduces decomposition of the fibres. During the steam treatment at least 90% by volume of air enclosed by the hollow natural fibres is preferably expelled by the steam before compression takes place. This results in a reduced chance of oxidation of the hollow natural fibres during the compression. In addition, the use of steam enables a homogenous heat transfer. Steaming and pressing can optionally take place simultaneously, for instance by means of a steam press.

It is advantageous if the heating method comprises of ultrasonic heating. Ultrasonic heating has the advantage that the desired temperature can be reached very quickly (within several seconds), thereby accelerating the production process. Ultrasonic heating makes use of frequencies of 20-40 kHz, which are converted into mechanical vibrations which are transferred to the material for treating and generate heat in the fibres. Ultrasonic heating is most preferably applied in combination with steam treatment, so that the advantages of both techniques are manifested.

It is advantageous if the hollow natural fibres are compressed in first zones at a first pressure, which alternate with second zones at a second pressure, wherein the second pressure is lower than the first pressure such that, in the formed material layer, dense material areas corresponding to the zones at the first pressure alternate with voluminous areas corresponding to the zones at the second pressure. The voluminous areas have a relatively high oil-absorbing capacity but a reduced tensile strength, while the dense material areas have less oil-absorbing capacity than the voluminous areas, but a greater tensile strength. By alternating these areas the material as a whole has a good tensile strength and also a good oil-absorbing capacity. In order to achieve the different first pressure and second pressure a profiled surface can for instance be brought into contact with the fibres. The surface can for instance have a grid pattern, wherein the dense material areas form a tensively strong grid inside which the voluminous areas are present in the form of cushions.

It is advantageous if the hollow natural fibres are mixed with an active quantity of antioxidant. This can take place both before the treatment and during the treatment and/or compression. The chance of degradation of organic components of the hollow natural fibres is thus reduced; and a better tolerance for oxidation at higher processing temperatures is obtained. The antioxidant is preferably sprayed or atomized as an aqueous solution over the hollow natural fibres. In a particular preferred embodiment the antioxidant is volatile and the antioxidant is brought mixed with steam into contact with the hollow natural fibres. Particularly suitable are for instance volatile essential oils. A substantially homogeneous distribution of the antioxidant on the fibres is thus obtained in simple manner. Any antioxidant can in principle be used, but apolar antioxidants such as essential oils are recommended due to their good adhesion to the hydrophobic fibres. In principle however, other antioxidants can also be used.

It is advantageous if the hollow natural fibres are mixed with a surfactant prior to compression. The processability of the hollow natural fibres is thus found to be improved. It is found particularly that a less high pressure need be used during compression in order to achieve a similar result. Any possible anionic, cationic or non-ionic surfactant can be used as surfactant. The surfactant can be mixed with the hollow natural fibres individually or together with an antioxidant, wherein a homogenous distribution is recommended. At least 0.1% by weight of surfactant is preferably used relative to the weight of the hollow natural fibres, more preferably at least 0.5% by weight.

It is advantageous if the hollow natural fibres are mixed with a fire-resistant agent prior to compression. The safety of the method is thus enhanced, since most hydrophobic hollow natural fibres, such as kapok, are flammable. The fire-resistant agent also gives the obtained material an improved resistance to heat and fire. The fire-resistant agent which is used can be any known flame-retardant, such as for instance tetrakis(hydroxymethyl)phosphonium salts or brominated organic compounds. The flame-retardant used is preferably apolar, whereby the best adhesion to the hydrophobic hollow natural fibres is obtained.

The invention also provides an apolar sorption material obtainable according to the method according to the invention, with an absorption capacity of at least 1 gram of apolar substances per gram of material. The material more preferably has an absorption capacity of at least 5 grams, most preferably 10 grams of apolar substances per gram of material. Such a material combines a good absorption capacity with an improved tensile strength compared to material manufactured from the same hollow natural fibres according to prior art methods. A typical apolar substance which can be absorbed by the material according to the invention is oil, such as lubricating oil or motor oil. Preferred embodiments which can be obtained via the method as described above are further possible.

It is advantageous if the material comprises a substantially homogeneous mixture of hydrophobic hollow natural fibres and reinforcing fibres. In such a mixture a good absorption capacity is combined with a sufficient tensile strength for applications wherein a greater mechanical load-bearing capacity is desired.

In a preferred embodiment the hollow natural fibres are substantially kapok fibres and the reinforcing fibres are substantially polypropylene fibres. This combination according to the invention is found to have particularly advantageous properties. Both raw materials are moreover inexpensive and generally available.

The invention further provides the use of a sorption material according to the invention as sorption medium for apolar substances. Apolar substances which can be absorbed include oil, paint, apolar control means (in particular herbicides, fungicides and pesticides), aromatic substances, combustion products and radioactive substances, which can be removed from gases, liquids and from surfaces using a material according to the invention. The material can take the form of for instance a filter, sponge or cloth.

In a preferred embodiment the material is used to clean gases. The material can function here as a gas filter or absorption surface, for instance in the gas inlet or outlet of a motor, factory, kitchen or air-conditioning.

In another preferred embodiment the material is used to clean liquids, in particular water. It is possible here to envisage water-treatment plants and the recovery of spilt apolar substances such as oil from surface water. Another application is as mats in geotextiles, with which herbicides or other apolar substances in the ground can be absorbed before they can reach the groundwater.

In yet another preferred embodiment the material is used to clean surfaces. It is possible here to envisage the absorption of spilt oil on workshop floors or in laboratories, the removal of lubricating oil from hands, or the cleaning of machines or pans.

The invention also provides a device for performing the method according to the invention, comprising at least a heating device adapted to heat the hollow natural fibres and pressing means adapted to co-act with the heating device for the purpose of compressing the hollow natural fibres. With such a device the method according to the invention can be performed in simple manner. The transport means are for instance a conveyor belt. The pressing means can for instance be a roller. In a preferred embodiment the heating means are steam means and/or ultrasonic means.

The invention will now be elucidated on the basis of the following non-limitative examples.

EXAMPLE

The following materials were made on the basis of kapok fibres which were pre-carded. The kapok fibres were treated with steam at an average temperature between 175-185° C. at the position of contact with the fibres, and then compressed into a material layer at the same temperature using a profiled roller at a pressure of 5 bar. The profile of the roller had a diamond pattern, whereby a material layer is created of cushions alternating with compressed zones with improved tensile strength (see FIG. 1). During compression the cushions are exposed to pressures lower than 5 bar. After compression the obtained material was dried by supplying a dry airflow with a relative air humidity of 85% and a temperature of 20° C. and by guiding this drying gas along the material layer, whereby water vapour is removed and the product is simultaneously cooled. The tensile strength and the oil-absorption capacity of the cooled product were determined.

In batch 2-4 of the examples the kapok fibres were mixed prior to pressing with 5, 10 and 20% by weight of polypropylene fibres relative to the kapok fibres, and further treated under the same conditions. A clear improvement in the tensile strength compared to the kapok fibres without steam treatment (batch 5) can however already be seen in batch 1 without polypropylene fibres, while the oil-absorption capacity remains the same. The oil-absorption capacity is however lower in all fibres processed to form material than in the case of loose kapok fibres (batch 6). The polypropylene fibres had a melting point of about 160° C. The kapok fibres can optionally be sprayed with a solution of an antioxidant and/or a surfactant prior to compression. This was however found to have a minimal influence on the oil-absorption capacity and the tensile strength. The compositions of the manufactured materials and the measured oil-absorbing capacities and tensile strengths can be found in table I.

TABLE I

| batch | Kapok fibres % by weight | Polypropylene fibres % by weight | Oil-absorption capacity | tensile strength |
|---|---|---|---|---|
| 1 | 100 | — | +++ | + |
| 2 | 95 | 5 | ++ | ++ |
| 3 | 90 | 10 | + | +++ |
| 4 | 80 | 20 | − | ++++ |
| 5* | 100 | — | ++++ | − |
| 6** | 100 | — | ++++ | − |

*without steam treatment a product comparable to loose kapok fibres is obtained
**loose kapok fibres FIG. 1 shows an example of a material layer 1 as obtained in example 1. The kapok fibres (optionally mixed substantially homogeneously with synthetic fibres such as polypropylene fibres) are compressed into dense material zones 2 alternated with voluminous cushions 3. The different zones 2, 3 are brought about by exerting a higher pressure at the position of dense material zones 2 than at the position of cushions 3, for instance by making use of a profiled roller or stamp. Cushions 3 have a higher oil-absorption capacity, while compressed zones 2 provide for the tensile strength. Zones 2 of high density preferably form a network, whereby a good tensile strength is obtained in different directions of surface 1.

Figure 2A:
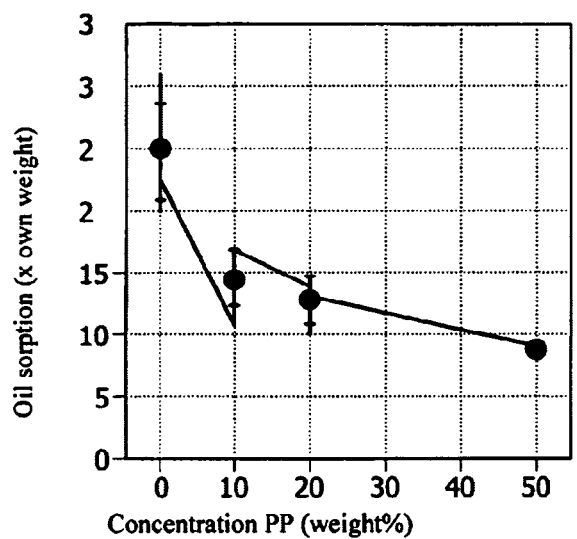
Figure 2B:
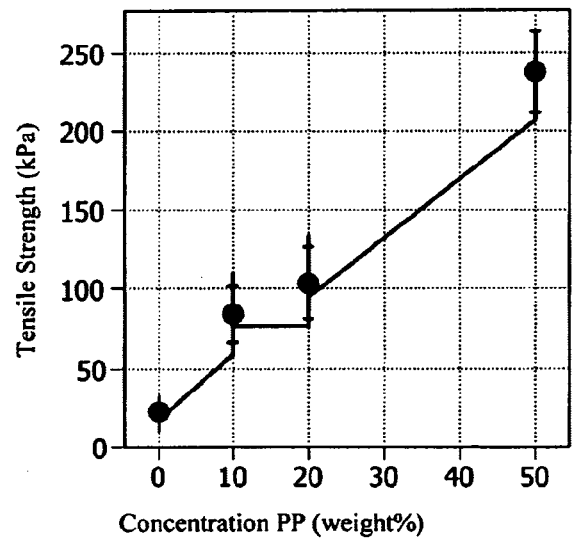

FIG. 2a shows the influence of the percentage by weight of polypropylene fibres (PP) on the oil-absorption capacity relative to its own weight, measured for material layers as shown in FIG. 1, manufactured according to the invention from a mixture of kapok and PP. It is apparent that an increasing concentration of PP reduces the oil-absorption capacity. In FIG. 2b the tensile strength of the same material layers is plotted in kPa against the percentage by weight of PP. A higher percentage of PP imparts a great tensile strength to the material. Depending on the desired application, a composition with sufficient tensile strength and with an optimal oil-absorption can be chosen from FIGS. 2a and 2b. Measurements wherein milkweed fibres or a mixture of kapok fibres and milkweed fibres are used instead of kapok fibres produce a similar result.

It will be apparent that many further variants and applications for materials manufactured according to the invention can be envisaged by a skilled person in the field.

The invention claimed is:

1. Method for manufacturing an apolar sorption material, comprising:
   providing hydrophobic hollow natural fibres with a hemicellulose content of at least 10% by weight,
   heating at least a part of the hollow natural fibres to a temperature between 160° C. and 220° C., and
   compressing at least a heated part of the treated hollow natural fibres;
   wherein, at least during the compression, the temperature of at least the heated part of the treated natural fibres is between 160° C. and 220° C., and
   wherein at least a part of the hollow natural fibres is wetted with water at least during the heating.

2. Method as claimed in claim 1, characterized in that the hollow natural fibres come from the group consisting of kapok, silk-cotton and milkweed.

3. Method as claimed in claim 1, characterized in that the hollow natural fibres are substantially kapok fibres.

4. Method as claimed in claim 1, characterized in that the hydrophobic hollow natural fibres are mixed substantially homogeneously with reinforcing fibres prior to the heating.

5. Method as claimed in claim 4, characterized in that the quantity of reinforcing fibres is 5-20% by weight relative to the hollow natural fibres.

6. Method as claimed in claim 4, characterized in that the reinforcing fibres are chosen from the group consisting of synthetic fibres, jute and hemp.

7. Method as claimed in claim 4, characterized in that the reinforcing fibres are thermoplastic synthetic fibres.

8. Method as claimed in claim 7, characterized in that the thermoplastic synthetic fibre comprises a polyolefin or a block copolymer of a polyolefin.

9. Method as claimed in claim 4, characterized in that the reinforcing fibres are polypropylene fibres and the hollow natural fibres are kapok fibres.

10. Method as claimed in claim 1, characterized in that the heating takes place by at least one heating method chosen from the group consisting of: steam, hot gas, ultrasonic, infrared, microwave, induction, and dielectric heating.

11. Method as claimed in claim 10, characterized in that the heating method involves steam heating.

12. Method as claimed in claim 10, characterized in that the heating method involves ultrasonic heating.

13. Method as claimed in claim 1, characterized in that the hydrophobic hollow natural fibres are compressed to form a material layer, wherein the hydrophobic hollow natural fibres are compressed in first zones at a first pressure, which alternate with second zones at a second pressure,
   wherein the second pressure is lower than the first pressure such that, in the formed material layer, dense material areas corresponding to the zones at the first pressure alternate with voluminous areas corresponding to the zones at the second pressure.

14. Method as claimed in claim 1, characterized in that at least during compression the temperature is between 170° C. and 190° C.

* * * * *